July 28, 1936.  L. F. JULIEN  2,049,064
WEATHER STRIP
Filed April 16, 1934
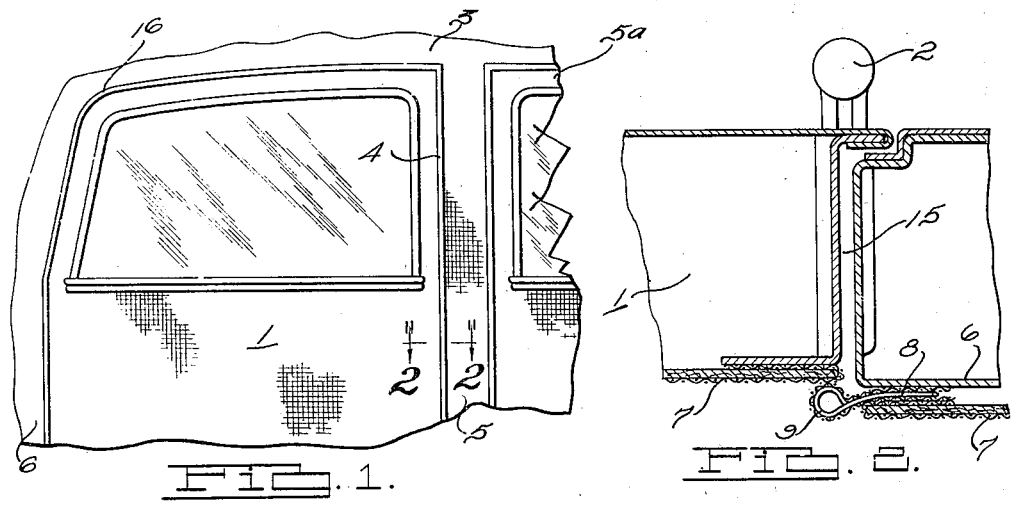
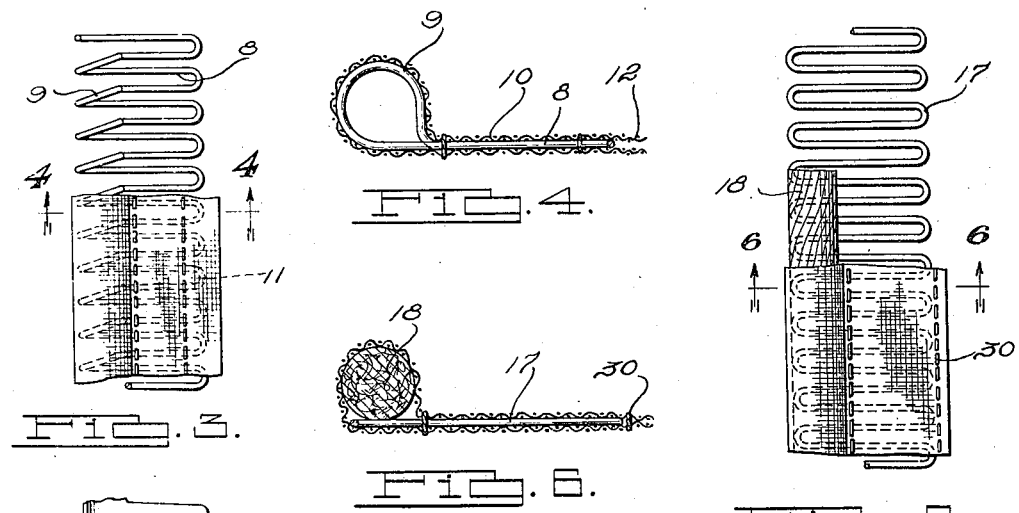
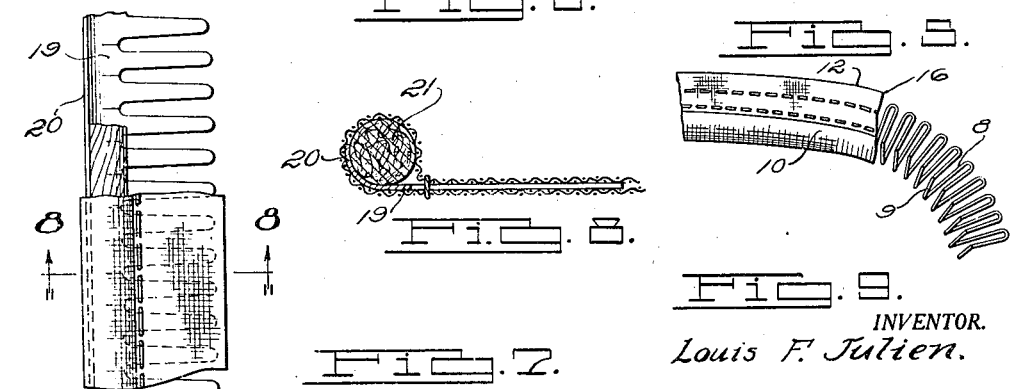
INVENTOR.
Louis F. Julien.
BY
ATTORNEY.

Patented July 28, 1936

2,049,064

UNITED STATES PATENT OFFICE 2,049,064

WEATHER STRIP

Louis F. Julien, Detroit, Mich., assignor to Chamberlin Metal Weather Strip Company, Detroit, Mich., a corporation of Michigan Application April 16, 1934, Serial No. 720,768

2 Claims. (Cl. 20—69)

This invention relates to weather stripping of a character utilizable in preventing an inflow of air through the interstice between a closed door and its surrounding frame and is particularly adaptable for use not only in buildings but in automobile bodies wherein the air in the small enclosed space is quickly changed in temperature by leakage of air through the interstice between the door and its frame and therefore particularly desirable in the modern form of ventilation of modern automobile bodies wherein egress of air is provided in order to prevent exhaustion of oxygen of the air and contamination of air within the body.

The object of the invention is to provide a very cheap weather stripping secured at one edge about the periphery of the door opening on the interior thereof and in the adaptation for the automobile body or for other possible use, the stripping may be made to conform to the character of the surrounding wall element, whether it be the upholstering of the automobile or the color scheme in the decoration of a building wall and/or door frame. With this object in view, the invention involves the formation of a resilient strip having an edge portion thereof engageable by the inner face of the door member at the edge when in closed position whereby the stripping attached at one edge to the frame element engages the inner face of the door adjacent its edge and is thus placed under tension by the closing of the door thereby effectually closing the interstice between the door and frame to air flow.

Another object of the invention is to provide a weather strip that is flexible and resilient transversely of its plane and likewise flexible longitudinally in the plane of the strip to enable the same to be secured in place on a curved line.

It is also a feature and object of the invention to form a resilient member of fine wire looped upon itself in parallel loops of the same length which determines the width of the strip and shaped or provided at one edge with an inturned portion out of the plane of the face of the strip secured to the door frame and engaging the door surface.

These and other objects and the various novel features of the invention are hereinafter more fully described and claimed, and the invention in its preferred form is shown in the accompanying drawing in which—

Fig. 1 is an elevation showing a portion of an automobile body door and the surrounding frame portion thereof.

Fig. 2 is a section taken on line 2—2 of Fig. 1.

Fig. 3 is an elevation of a portion of the wire strip and its covering.

Fig. 4 is an enlarged section taken on line 4—4 of Fig. 3.

Fig. 5 is an elevation of a modified form of my improved weather strip.

Fig. 6 is an enlarged section taken on line 6—6 of Fig. 5.

Fig. 7 is an elevation of another form of the invention in which the resilient element is of sheet metal.

Fig. 8 is an enlarged section taken on line 8—8 of Fig. 7.

Fig. 9 is a view of the strip and the manner in which it may be laid along a curved line.

The weather stripping is adapted for use about any character of door opening and while I have shown and hereinafter described the strip as applied to the door of an automobile body, it is to be recognized that this is only a typical illustration of one use of the weather stripping and that in the same general manner the stripping may be applied about the frame of the door of a building or other enclosed space having a door and an opening closable thereby.

In Fig. 1 is shown a door member 1 having the hinged elements 2 for swingably supporting the same in the opening therefor in an automobile body indicated at 3. The door has an exterior flange 4 but such flange is not important and may be dispensed with so far as my invention is concerned and one side frame of the door is indicated at 5 which in the structure shown also provides the frame element for a second door indicated at 75ª.

In the enlarged section of Fig. 2, the door 1 is shown as being hinged to the outer face of the frame 6 and the thickness of the door is approximately that of the frame member thereabout in this particular case. On the interior of the door as well as the body and the stile 5, I have shown fabric upholstering indicated at 7.

It has been the practice heretofore to use a hemmed cloth element about the door opening to seal the interstice but such character of element through use becomes displaced and soon stands outwardly from the door leaving the interstice open to a flow of air into the body. By my invention, I have provided a resilient base or body member of wire as shown at 8 in Figs. 2 and 3 which is formed of a series of parallel loops defining the width of the body and the loops 9 at one edge are each bent to form a coil of a single turn extending to one side of the plane of the body. The body is covered with the fabric 10 preferably of the same character as the fabric upholstering 7. These loop portions 9 lying inwardly, that is, toward the door from the plane of the body of the strip, are engaged by the door and flexed outwardly upon closing the door whereby the enlarged or loop portion is held in tension engagement with the face of the door. The construction of this strip will be more fully understood from Figs. 3 and 4. It will be seen that the resilient body of the strip is formed of a small resilient wire such as piano wire and consists of the parallel loops, the loops being in U form at one end as for instance the right side of Fig. 3 and form the body of the strip and the opposite end connecting the successive loops at the left of Fig. 4 are in the form of a coil 9 of practically a single turn. This, as will be understood from Fig. 4, is so arranged that the coil 9 extends toward one side of the body portion which lies flat.

The resilient body of the strip is covered by a fabric 10 which may be sewed in place by stitching across the wire loops one or more times as indicated by dotted lines 11 in Fig. 3 or it may be stitched at the end 12 and thus securely held on the resilient body. This strip, due to its character of form, may be tacked in place or otherwise secured to the face of the frame of the door opening, the upper surface thereof, as shown in Fig. 4, being toward the frame and, as indicated in Fig. 2, the loop portion 8 extends beyond the frame across the interstice between the frame 6 and door portion 1 and inwardly of the opening to engagement with the inner face of the closed door at each edge. The engagement of the strip with the door places the strip under tension which is inherent in the wire or other form of resilient body portion of the strip. Thus the interstice 15 between the door and frame is closed due to the contact of the strip edge with the door member under tension. The strip is intended to be secured about the two vertical sides and the cross portion of the frame at the top of the door and, due to the character of strip it may be readily bent on a curve longitudinally as will be understood from Fig. 9. It is necessary to so bend the strip at the point 16 of the door opening which is a curved line and the door has a similarly curved line, the strip being placed on the inner face of the frame and extending over this curved edge to engage the inner face of the door.

The invention is not confined to the specific structure of strip indicated in Fig. 3. It may be formed of a series of straight and parallel wire loops 17 as indicated in Fig. 6 around which a fabric is secured and a core 18, as shown in Fig. 6, is fastened in the fabric at one edge of the strip formed of the said wire loops 17. The core and the projection formed thereby and covered with the fabric serves the same purpose as the coil 9 of the form of strip shown in Fig. 3, the body of the strip of Fig. 6 being tacked to the frame about the door opening.

It is also possible to form the resilient member of a strip of very thin sheet metal indicated at 19 in Fig. 7. This form of the body of the strip has an outturned edge portion 20 and the body is formed of a series of substantially paral'el prongs. It is this prong portion that is attached to the frame of the door opening and a core 21 is also provided in this form lying in the curved edge 20 and extends toward the inner face of the door at the edge in the same manner as is shown with the wire structure 8 having the loop 9 as shown in Fig. 2. It will therefore be seen that while preferably the resilient body is formed of a small diameter piano wire, it may be made of other character of material such as sheet metal of the desired flexibility and resiliency which function in the same general manner and is capable of being laid in place in long strips extending around the periphery of the door opening on the inner side thereof and shaped to lie in practical parallelism with the inner face of the opening.

With the arrangement shown in Figs. 3 and 5 and due to the small diameter of the wire, the fabric may be readily stitched to the body or may be secured by stitching the two edges of the fabric as at 12 in Fig. 4 or as at 30 in Fig. 6. While it would be usual in an automobile body to weather-strip at least the top and two vertical sides of the door opening it may be employed on the inner face of the threshold which usually extends a little above the floor of the automobile or of a building providing a space below the door to which the body of the strip may be attached at the bottom and with the rolled portion of either of the forms of structure shown extending slightly above the upper surface of the door sill to be engaged by the inner face of the door at the bottom.

It will be evident from the foregoing that the structure is of very simple character; that the resiliency of the strip is not impaired through use due to its not being flexed to beyond its elastic limit in the closing of the door thereagainst and thus will continue to function for a long period of time and prevent ingress of air to the enclosed space to which the door opens, whether an automobile body or other character of structure, and also that the various objects of the invention are attained by the construction described.

Having thus briefly described my invention, its utility and mode of operation, what I claim and desire to secure by Letters Patent of the United States is—

1. A weather strip for use between a door and frame member having an opening into which the door may be moved to close the same, comprising a resilient metal strip transversely flexible of its plane, said strip consisting of a spring wire element formed of a series of closely return bent portions defining a body of the desired width, a core of suitable material positioned at one edge of the resilient metal strip and extending outwardly on one side thereof, and a fabric covering for the strip and core secured thereover to maintain the core in position, the strip being attached to the inner face of the frame and the edge containing the core extending beyond the interstice between the door and the frame when in closed relation and with the fabric covered core of the strip forced outwardly through contact with the inner face of the door to thereby place the strip under tension.

2. A weather strip for use between a door and a frame member having an opening into which the door may be moved to close the same, comprising a resilient metal strip consisting of a spring wire shaped to form a series of closely return bent portions lying in the same plane and providing a strip of a width of body to extend across the interstice between the door and the frame when in closed relation, the loops at one edge of the strip each being shaped to form a coil extending on one side of the plane of the body, a cover member for the strip, the body of the strip being secured to the face of the frame and extending across the interstice and with the coiled edge extending inwardly of the plane of the face of the frame to be engaged by the inner face of the door when closed to thereby place the strip in contact therewith under spring tension therewith.

LOUIS F. JULIEN.